(12) United States Patent
Leys et al.

(10) Patent No.: US 10,443,999 B2
(45) Date of Patent: Oct. 15, 2019

(54) CONNECTION VERIFICATION TOOL

(71) Applicant: ENTEGRIS, INC., Billerica, MA (US)

(72) Inventors: John A. Leys, Chaska, MN (US); Michael Schleicher, Victoria, MN (US)

(73) Assignee: ENTEGRIS, INC., Billerica, MA (US)

( * ) Notice: Subject to any disclaimer, the term of this patent is extended or adjusted under 35 U.S.C. 154(b) by 199 days.

(21) Appl. No.: 15/626,833

(22) Filed: Jun. 19, 2017

(65) Prior Publication Data

US 2017/0370691 A1    Dec. 28, 2017

Related U.S. Application Data

(60) Provisional application No. 62/353,295, filed on Jun. 22, 2016.

(51) Int. Cl.
| | |
|---|---|
| *G01B 5/14* | (2006.01) |
| *G01B 3/38* | (2006.01) |
| *G01B 3/42* | (2006.01) |
| *G01B 3/34* | (2006.01) |
| *F16L 19/00* | (2006.01) |

(52) U.S. Cl.
CPC ............... *G01B 5/14* (2013.01); *G01B 3/34* (2013.01); *G01B 3/38* (2013.01); *G01B 3/42* (2013.01); *F16L 19/00* (2013.01); *F16L 2201/10* (2013.01)

(58) Field of Classification Search
CPC .............. G01B 3/38; G01B 3/42; G01B 5/14
USPC ......................................... 33/501.08, 501.45
See application file for complete search history.

(56) References Cited

U.S. PATENT DOCUMENTS

| | | | | | |
|---|---|---|---|---|---|
| 1,327,216 | A | * | 1/1920 | Rouanet ................... | G01B 3/38 33/517 |
| 1,883,446 | A | * | 10/1932 | Alderborgh .............. | G01B 3/38 33/501.3 |
| 2,551,059 | A | * | 5/1951 | Shockley ................. | G01B 3/38 33/567 |
| 2,650,434 | A | * | 9/1953 | Brandt ..................... | G01B 3/38 33/567 |
| 2,794,257 | A | * | 6/1957 | Blake, Jr. ................ | G01B 3/38 33/812 |
| 3,287,813 | A | * | 11/1966 | Lennon .................... | G01B 3/42 285/93 |
| 3,296,704 | A | * | 1/1967 | Zajkowski ............... | G01B 3/38 33/501.1 |
| 4,781,086 | A | * | 11/1988 | Johnston ................. | B25B 13/48 269/249 |
| 5,390,427 | A | * | 2/1995 | Heller .................... | G01B 3/004 33/810 |
| 9,428,923 | B1 | * | 8/2016 | Christner ............ | E04F 21/0015 |

(Continued)

*Primary Examiner* — Christopher W Fulton
(74) *Attorney, Agent, or Firm* — Entegris, Inc.

(57) ABSTRACT

A connection verification tool for verifying a secure connection between two fluid handling components of a fluid handling system. A connection verification tool can include a gauge portion sized sized to be placed over a first fluid handling component connected to a second fluid handling component to verify a secure connection between the two components. If the first fluid handling component is not securely connected to the second fluid handling component such that additional torque may be required to complete the connection between the two components, the gauge portion of the connection verification tool will not fit over the first component coupled to the second component.

10 Claims, 7 Drawing Sheets

(56) References Cited

U.S. PATENT DOCUMENTS

| | | | | |
|---|---|---|---|---|
| 2004/0231178 A1* | 11/2004 | Collins | ............... | E04F 21/00 |
| | | | | 33/613 |
| 2005/0097763 A1* | 5/2005 | Williams | ............ | F16L 19/00 |
| | | | | 33/501.45 |
| 2008/0276475 A1* | 11/2008 | Schafer | ................ | G01B 3/34 |
| | | | | 33/501.45 |
| 2015/0226534 A1* | 8/2015 | Rodriguez | ........... | G01B 3/34 |
| | | | | 33/501.45 |

* cited by examiner

CONNECTION VERIFICATION TOOL

TECHNICAL FIELD

This disclosure relates generally to fittings for fluid handling systems and more particularly, to tools for verifying the connection of such fittings.

BACKGROUND

Fluid handling systems for semiconductor applications must meet several specifications. They must be compatible with highly corrosive chemistries, and they also must be able to maintain the high purity of the chemicals flowing within the fluid system. A secure connection between various fluid handling components in the fluid handling system is important for avoiding leaks in the fluid handling system. Exemplary fluid handing components may include fitting bodies, nuts, caps, inserts and verification rings. A need for verifying a secure connection between fluid handling components has been identified.

SUMMARY OF THE INVENTION

This disclosure is directed to fittings for fluid handling systems and more particularly, to tools for verifying the connection of such fittings. According to some embodiments, a tool can include a gauge portion including a first arm, a second arm and a cross member extending between the first arm and the second arm and having a width dimensioned to correspond to a dimension of a fitting member coupled to a fitting body, such that when the fitting member is properly coupled to the fitting body the gauge portion fits over the fitting member connected to the second fitting member According to another embodiment, a method of verifying a connection includes selecting a connection verification tool based at least in part on the size of a fitting including a fitting member connected to a fitting body, the connection verification tool including a gauge portion having a first arm, a second arm and a cross member extending between the first arm and the second arm, wherein a gap is defined between the first arm and the second arm, the gap being dimensioned to correspond to a dimension of the fitting member coupled to the fitting body, such that when the fitting member is properly coupled to the fitting body the gauge portion fits over the fitting member connected to the second fitting member; placing the gauge portion over the fitting member connected to the fitting body; and verifying that the fitting member is properly connected to the fitting body when the gauge portion of the verification tool fits over the fitting member connected to the fitting body.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings.

Figure 1:
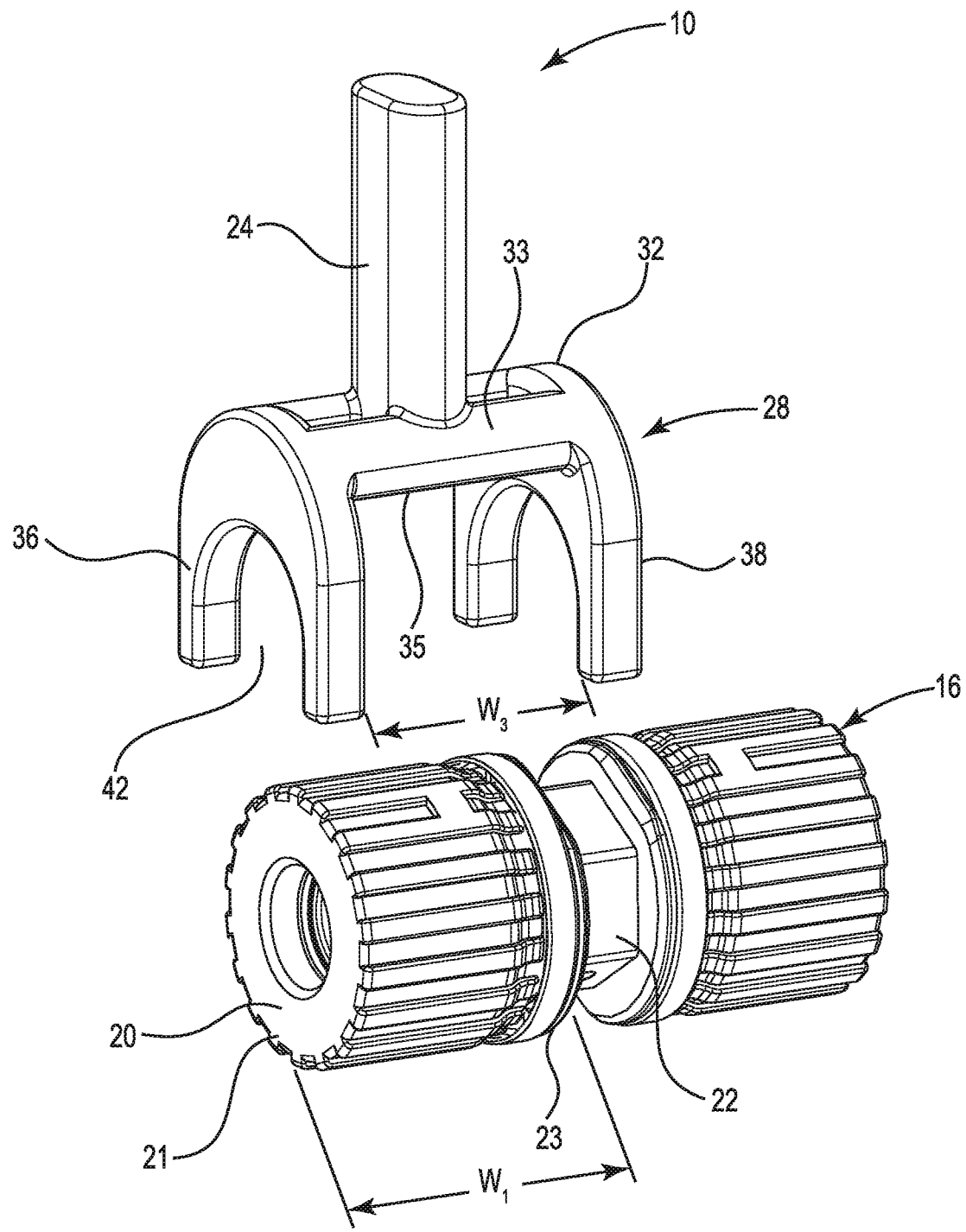
FIG. 1 is a perspective view of a connection verification tool and a fitting in accordance with an embodiment of the disclosure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g. 1 to 5 includes 1, 1.5, 2, 2.75, 3, 3.80, 4 and 5).

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

The connection verification tools, as described herein according to the various embodiments, provides a quick and easy to use mechanism for verifying a secure connection between various fluid handling components within a fluid handling system. In particular, the connection verification tools, as described herein, provide a quick and easy to use mechanism for verifying a second connection between two fluid handling components during and/or after their initial connection to one another. In some cases, a connection verification tool, as described herein, can be sized such that it can fit in a user's pocket making in it readily available for use.

Figure 2:
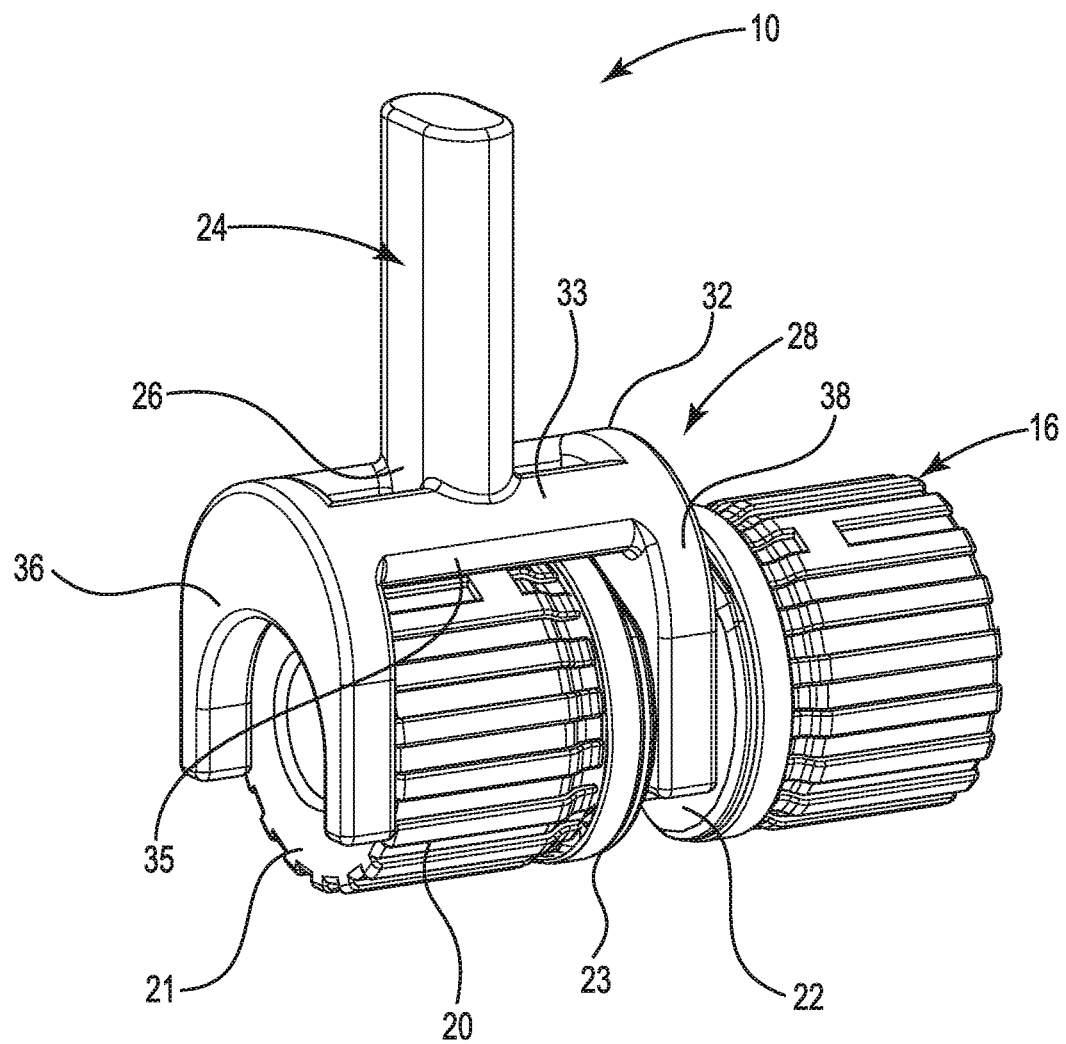
FIGS. 2 and 3 show different views of the connection verification tool of FIG. 1 engaged with the fitting.
Figure 3:
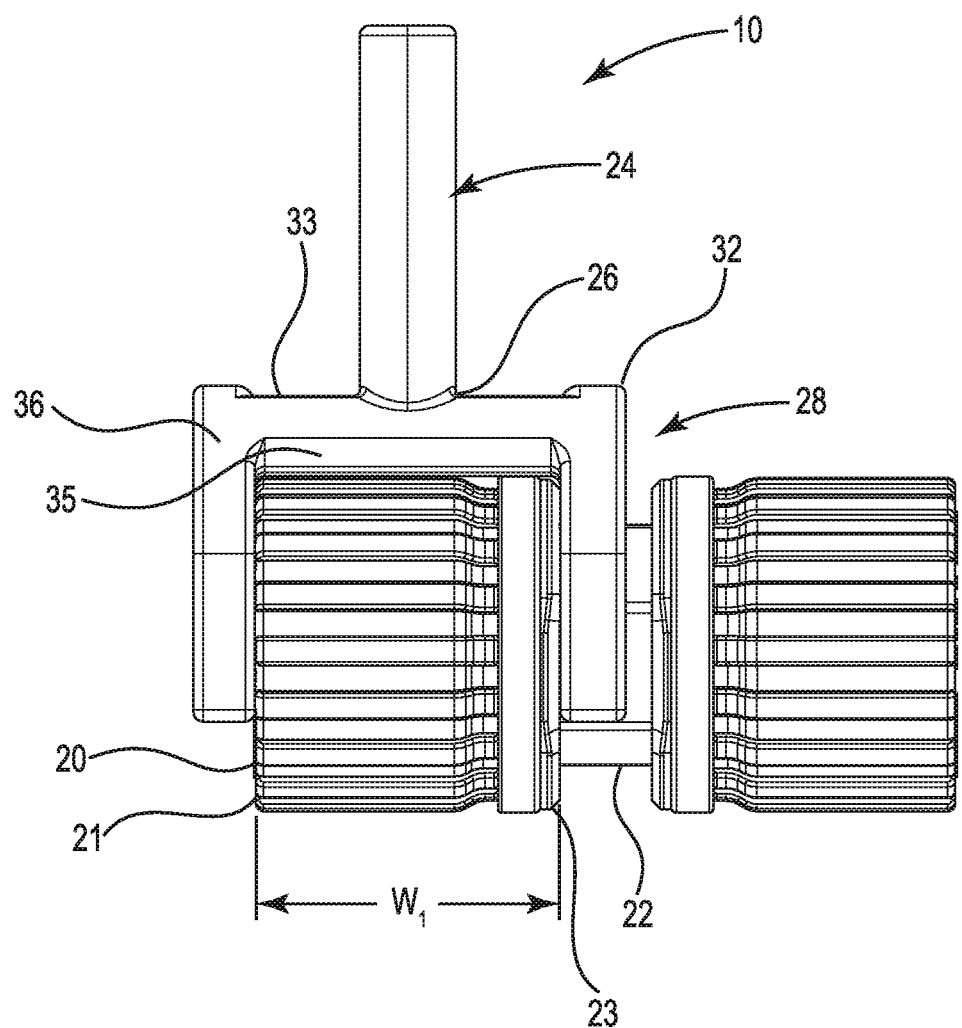

FIGS. 1-3 show various views of an exemplary connection verification tool 10 according to an embodiment and a fitting 16. The fitting 16 includes a fitting member 20 connected to a fitting body 22. Exemplary fittings include the PRIMELOCK® fittings manufactured and sold by Entegris, Inc. of Billerica, Mass. Fittings are available in a variety of connection sizes. In some cases, the fitting member 20 can include a nut, cap, insert or connection verification ring. By way of illustration, as shown in the figures, the fitting member 20 can be a nut. The fitting body 22 can include a threaded portion (not shown) for engaging the fitting member 20 and a flange 23, and can be any one of a straight fitting body, an elbow fitting body, or a tee fitting body. When the fitting member 20 is coupled to the fitting body 22, the fitting 16 can be any one of a straight union fitting, an elbow adaptor or a tee union fitting.

When a fitting member 20 is first coupled to a fitting body 20 during initial assembly of a fluid handling system, the fitting member 20 and fitting body define a predetermined width $W_1$ defined between a first end 21 of the fitting member 20 and a flange 23 of the fitting body 22. The predetermined width $W_1$ is indicative of a secure connection between the fitting member 20 and the fitting body 22. If a measured width $W_2$ is greater than the predetermined width $W_1$ when the fitting member 20 is connected to the fitting body 22, a secure connection between the components has not been achieved indicating that additional torque is needed to achieve a secure connection. Over time and with repeated use, it will be generally recognized by those of skill in the art that the width $W_1$ defined between a first end 21 of the fitting member 20 and a flange 23 of the fitting body 22 may decrease.

The connection verification tool 10 can be used to verify a secure connection between a fitting member 20 and a fitting body 22. For example, the connection verification tool 10 can be used to verify that a secure connection between a nut and straight fitting was made as shown in FIGS. 2 and 3 by placement of the connection verification tool 10 over the fitting member 20 coupled to the fitting body 22. A secure connection is one in which enough torque has been applied to the fitting member 20 such that the connection between the fitting member 20 and fitting body 22 is fluid tight and does not leak.

Referring now to FIG. 1, the connection verification tool 10 is a hand-held tool including an optional handle 24 connected to a gauge portion 28. The connection verification tool 10 can be injected molded from a thermoplastic material or machined from a metal or metal alloy. The gauge portion 28 is sized to be placed over a fitting member 20 connected to a second body 22 to verify a secure connection between the two components. If the fitting member 20 is not securely connected to the fitting body 22 such that additional torque may be required to complete the connection between the two components, the gauge portion 28 of the connection verification tool 10 will not fit over the fitting member 20 coupled to the fitting body 22. The gauge portion 28 can be sized to verify the connection between fittings having a standard size. For example, fittings used for semiconductor applications are available in sizes ranging from 0.25 inches (0.635 cm) to 2 inches (5.08 cm). However, the gauge portion can be sized to work with fittings smaller than 0.25 inches (0.635 cm) or greater 2 inches (5.08 cm) as necessary or desired.

As shown in FIGS. 1-3, the gauge portion 28 includes a cross member 32 coupled to a distal end 26 of the handle 24. The cross member 32 has an upper surface 33 and a lower surface 35 that is configured to contact the fitting member 20. In one embodiment, the lower surface 35 of the cross member 32 is substantially flat. In another embodiment, as can be seen in FIG. 1, the lower surface 35 can be contoured that corresponds to the curvature of the fitting member 20.

Additionally, the cross member 32 includes a first arm 36 extending from a first end of the cross member and a second arm 38 extending from a second end of the cross member 32 The arms 36, 38 extend in a downward direction away from the first end and the second end of the cross member, respectively. The length of each of the arms 36, 38 extending in a direction away from the cross-member 32 can be equal or different from one another. As shown in the illustrative embodiments of FIG. 1, the lengths of each of the arms 36 are equal to one another. In other cases, as will be described in greater detail herein a length of a first arm 36 may be greater than a length of a second arm 38.

In many embodiments, one or both of the arms 36, 38 can have a profile that permits the connection verification tool 10 to engage a portion of the fitting body 22 when the gauge portion 28 is engaged with the fitting 16. Further, one or both of the arms 36, 38 can be configured to limit or eliminate interference between the connection verification tool 10 and any tubing that may be fluidly coupled with the fitting 16. For example, as shown in FIGS. 1-3, one or both of the arms 36, 38 can include a recessed portion 42. The recessed portion 42 facilitates placement of the tool 10 over any tubing that may be present and/or over a portion of the fitting body 22. In some cases, the recess 42 can be generally U-shaped. In other cases, the recess 42 can be generally V-shaped.

A width $W_3$ is defined between the arms 36, 38. In various embodiments, the width of the cross member 32 defined between the arms 36, 38 is sized such that it substantially equals the width $W_1$ defined between a first end 21a of the fitting member 20 and a flange 23 of the fitting body 22 when the fitting member 20 is securely connected to the fitting body. In use, when the gauge portion 28 of the connection verification tool 10 is engaged with a fitting 16, a first arm 36 extends along an outer surface of the fitting member 20 and the second arm 38 extends along an outer surface of the flange 23 to indicate a secure connection between the fitting member and the fitting body.

Figure 4:
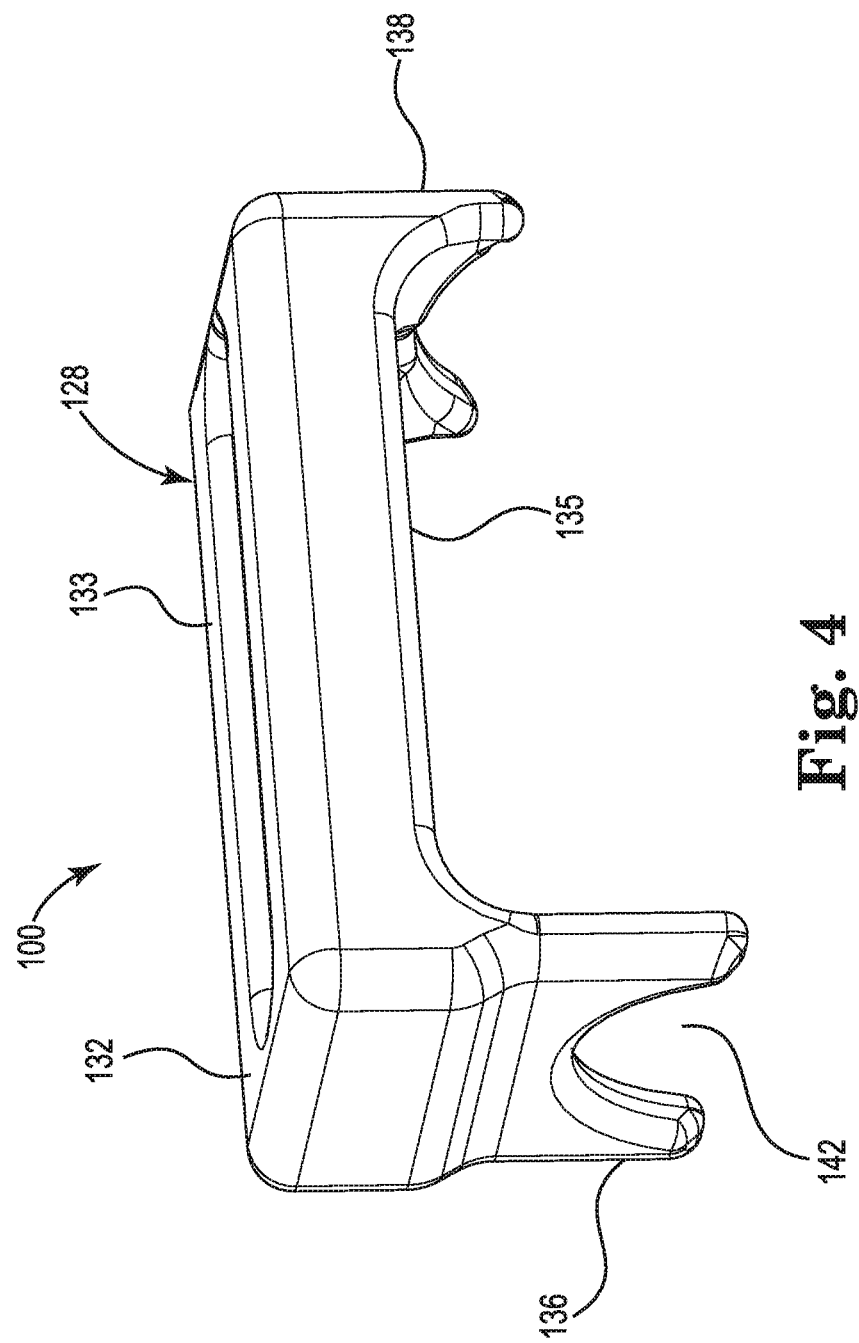
FIG. 4 is a perspective view of a connection verification tool in accordance with another embodiment of the disclosure.
Figure 5:
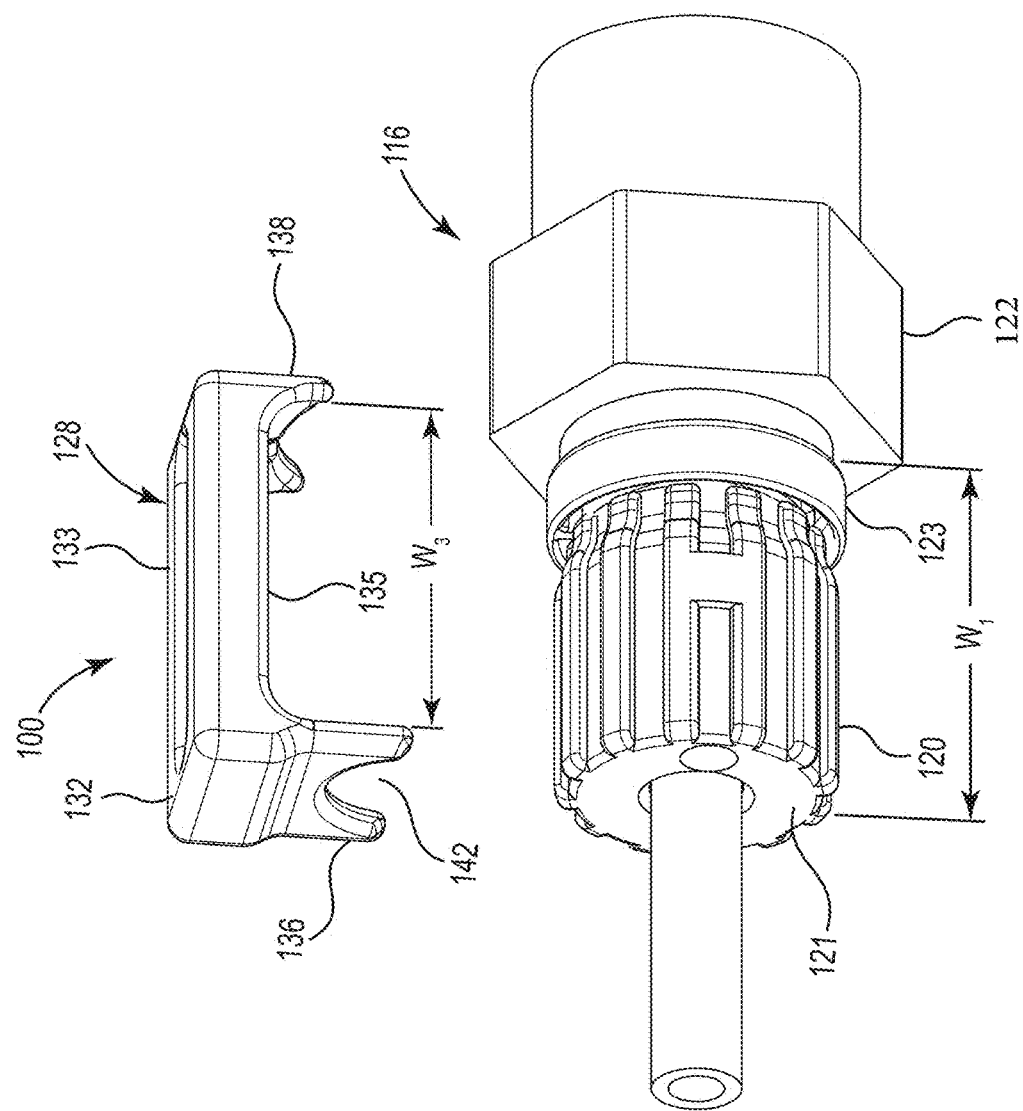
FIG. 5 is a perspective view of the connection verification tool of FIG. 4 and a fitting in accordance with an embodiment of the disclosure.
Figure 6:
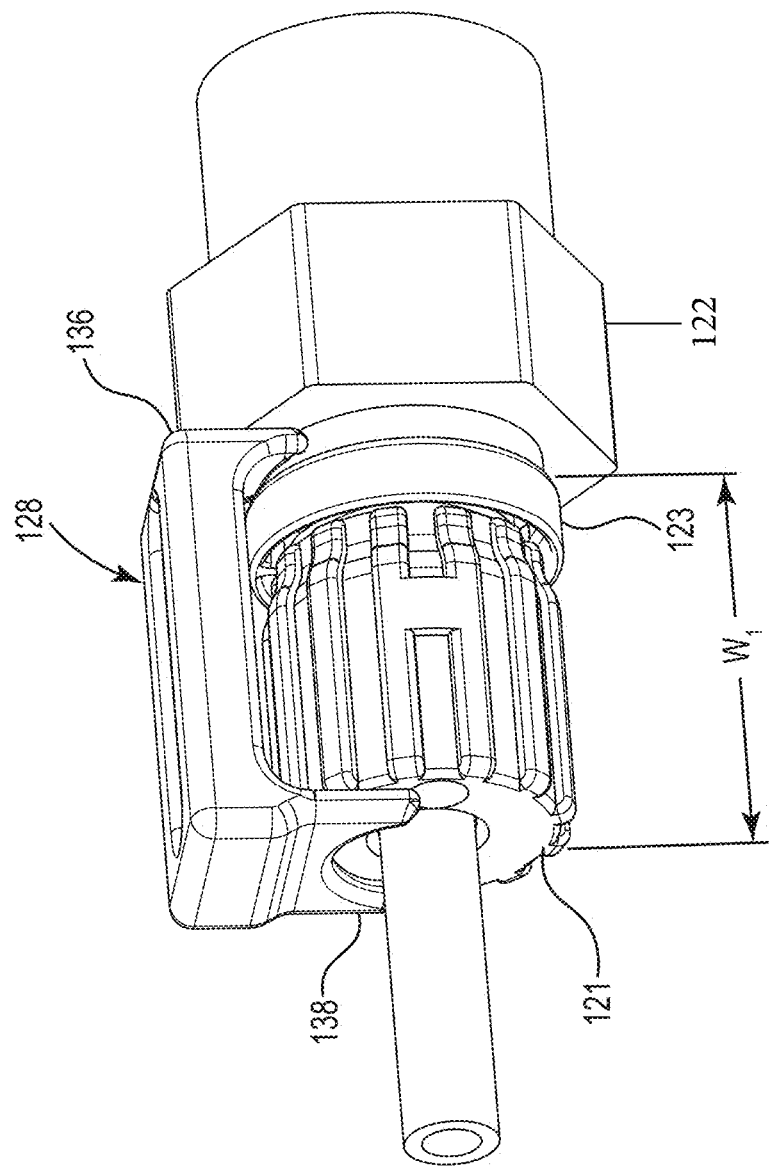
FIG. 6 is a perspective view of the connection verification tool of FIGS. 4 and 5 engaged with the fitting of FIG. 5.

FIGS. 4-6 show various views of an exemplary connection verification tool 100 according to an embodiment and a fitting 116. The connection verification tool 100 also can be injected molded from a thermoplastic material or machined from a metal or metal alloy. The fitting 116 includes a fitting member 120 connected to a fitting body 122. Exemplary fittings have been previously described herein.

When a fitting member 120 is first coupled to a fitting body 122 during initial assembly of a fluid handling system, the fitting member 120 and fitting body 122 define a predetermined width $W_1$ defined between a first end 121 of the fitting member 120 and a flange 123 of the fitting body 122. The predetermined width $W_1$ is indicative of a secure connection between the fitting member 20 and the fitting body 22. A secure connection is one in which enough torque has been applied to the fitting member 120 such that the connection between the fitting member 120 and fitting body 122 is fluid tight and does not leak. If a measured width $W_2$ is greater than the predetermined width $W_1$ when the fitting member 20 is connected to the fitting body 122, a secure connection between the components has not been achieved indicating that additional torque is needed to achieve a secure connection. Over time and with repeated use, it will be generally recognized by those of skill in the art that the width $W_1$ defined between a first end 121 of the fitting member 120 and a flange 123 of the fitting body 122 may decrease.

Like connection verification tool 10, discussed herein, the connection verification tool 100 can be used to verify a secure connection between a fitting member 120 and a fitting body 122. For example, the connection verification tool 100 can be used to verify that a secure connection between a nut and straight fitting was made, as shown in FIGS. 5 and 6, by placement of the connection verification tool 100 over the fitting member 120 coupled to the fitting body 122. Referring now to FIG. 4, the connection verification tool 100 is a hand-held tool having a gauge portion 128. The gauge portion 128 is sized to be placed over a fitting member 120 connected to a fitting body 122 to verify a secure connection between the two fitting components. If the fitting member 120 is not securely connected to the fitting body 122 such that additional torque may be required to complete the connection between the two components, the gauge portion 128 of the connection verification tool 100 will not fit over the fitting member 120 coupled to the fitting body 122. The gauge portion 128 can be sized to verify the connection between fittings having a standard size. For example, fittings used for semiconductor applications are available in sizes ranging from 0.25 inches (0.635 cm) to 2 inches (5.08 cm). However, the gauge portion can be sized to work with fitting smaller than 0.25 inches (0.635 cm) or greater 2 inches (5.08 cm) as necessary or desired.

As shown in FIGS. 4-6, the gauge portion 128 includes a cross member 132. The cross member 132 has an upper surface 133 and a lower surface 135 that is configured to contact the fitting member 120. In some embodiments, as shown, the lower surface 135 of the cross member 132 can be substantially flat. Additionally, the cross member 132 includes a first arm 136 extending from a first end and a second arm 138 extending from a second end of the cross member 132. Each of the first and second arms 136, 138 extend in a downward direction away from the first and second ends of the cross member 132, respectively. As shown in the embodiment depicted in FIGS. 4-6, a length of a first arm 36 can be greater than a length of a second arm 38.

One or both of the arms 136, 138 can have a profile that permits the connection verification tool 100 to engage a portion of the fitting body 122 when the gauge portion 128 is engaged with the fitting 116. Further, one or both of the arms 136, 138 can be configured to limit or eliminate interference between the connection verification tool 100 and any tubing that may be fluidly coupled with the fitting 116. For example, as shown in FIGS. 4-6, one or both of the arms 136, 138 can include a recessed portion 142. The recessed portion 142 facilitates placement of the tool 100 over any tubing that may be present and/or a portion of the fitting body 122. In the depicted embodiment, the recess 142 can be generally V-shaped.

A width $W_3$ is defined between the arms 136, 138. In various embodiments, the width of the cross member 132 defined between the arms 136, 138 is sized such that it substantially equals the width $W_1$ defined between a first end 121 of the fitting member 120 and a flange 123 of the fitting body 122 when the fitting member 120 is securely connected to the fitting body. In use, when the gauge portion 128 of the connection verification tool 100 is engaged with a fitting 116, a first arm 136 extends along an outer surface of the fitting member 120 and the second arm 138 extends along an outer surface of the flange 123 to indicate a secure connection between the fitting member and the fitting body.

Figure 7:
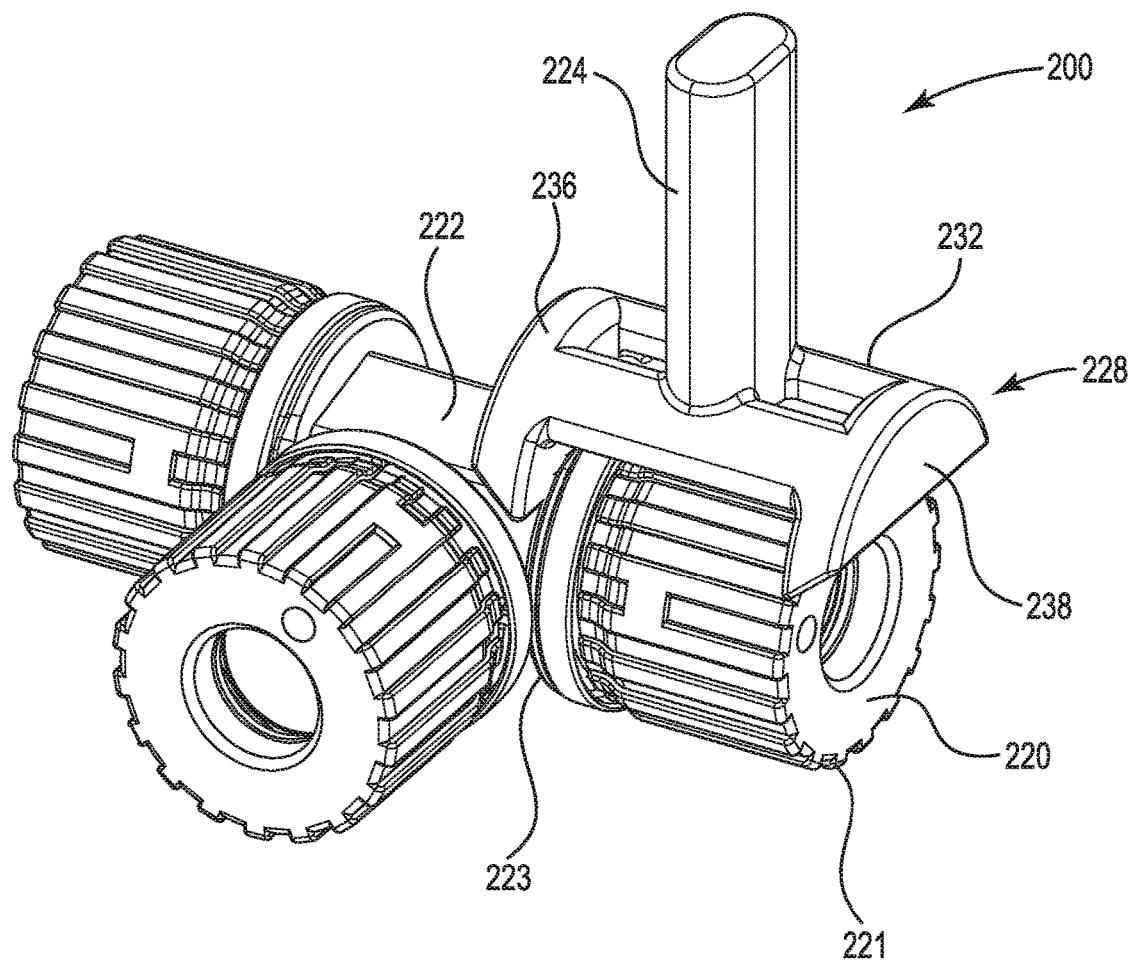
FIG. 7 is a perspective view of a connection verification tool according to another embodiment of the disclosure engaged with a fitting.

FIG. 7 shows a tool 200 according to yet another embodiment. The tool 200 is configured such that it can be engaged with a three-way fitting or tee fitting. Similar to the tool 10 shown in FIGS. 1-3, the tool 200 includes a handle 224 connected to a gauge portion 228. The gauge portion includes a cross member 232 coupled to a distal end of the handle 224. Rather than arms, the cross member 232 is configured such that it has first and second shoulders 236, 238. The first and second shoulders 236, 238 are configured to contact and engage the top surface of a fitting. A width is defined between the shoulders 236, 238. In various embodiments, the width of the cross member 232 defined between the shoulders 236, 238 is sized such that it substantially equals the width defined between a first end 221 of the fitting member 220 and a flange 223 of the fitting body 222 when the fitting member 120 is securely connected to the fitting body. In use, when the gauge portion 228 of the connection verification tool 200 is engaged with a fitting 216, an inner surface of the first shoulder 236 contacts an outer surface of the fitting member 220 and an inner surface of the second shoulder 238 contacts an outer surface of the flange 223 to indicate a secure connection between the fitting member 220 and the fitting body 222. If the first and second fittings 220 and 222 are not properly connected to one another such that additional torque may be required to complete the connection, the gauge portion 228 will not fit over the first fitting member 220 indicating that the connection between the two fittings 220 and 222 is incomplete and additional torque is needed to complete the connection. The connection verification tool 200 can be used to verify the connection between the fitting body 222 and other fitting members of the three-way or tee fitting as necessary or desired.

During initial set up and assembly of at least a portion of a fluid handling system an operator can select a connection verification tool based at least in part on the size of the fluid handling components to be connected with one another. As described herein according to the various embodiments, the connection verification tool can include a gauge portion having a first arm, a second arm and a cross member extending between the first arm and the second arm, the cross member having a width defined between the first arm and the second arm dimensioned to correspond to a dimension of the fitting member coupled to the fitting body, such that when the fitting member is properly coupled to the fitting body the gauge portion fits over the fitting member connected to the second fitting member. The operator may then place the gauge portion over the fitting member connected to the fitting body and verifying that the fitting member is properly connected to the fitting body when the gauge portion of the verification tool fits over the fitting member connected to the fitting body.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed

What is claimed is:

1. A tool comprising:
   a gauge portion including a first arm, a second arm and a cross member extending between the first arm and the second arm, wherein at least one of the first arm and the second arm includes a recessed portion and wherein the gauge portion has a predetermined, fixed width $W_1$ defined between the first and second arms and dimensioned to correspond to a predetermined width $W_2$ defined between a fitting member and a fitting body when the fitting member is coupled to the fitting body, such that when the fitting member is properly coupled to the fitting body, $W_1$ is at least substantially equal to $W_2$, and the gauge portion fits over the fitting member connected to the second fitting member such that a proper connection between the fitting body and the fitting member can be verified.

2. The tool according to claim 1, wherein the recessed portion is generally U-shaped.

3. The tool according to claim 1, further comprising a handle coupled to the gauge portion.

4. The tool according to claim 1, wherein the first arm has a length extending in a direction away from the cross member that is greater than a length of the second arm extending in a direction away from the cross member.

5. The tool according to claim 1, wherein the first arm has a length extending in a direction away from the cross-member that is equal to a length of the second arm extending in a direction away from the cross-member.

6. The tool according to claim 1, wherein the cross member has an upper surface and a lower surface, wherein the lower surface is contoured to correspond to a radius of curvature of a fitting member.

7. The tool according to claim 1, wherein the cross member has an upper surface and a lower surface, where the lower surface is substantially flat.

8. The tool according to claim 1, wherein the tool is fabricated from a metal or metal alloy.

9. The tool according to claim 1, wherein the tool is fabricated from a thermoplastic polymer.

10. A method of verifying a connection comprising:
selecting a connection verification tool based at least in part on the size of a fitting including a fitting member connected to a fitting body, the connection verification tool including a gauge portion having a first arm, a second arm and a cross member extending between the first arm and the second arm, wherein a gap is defined between the first arm and the second arm, the gap having a predetermined, fixed width $W_1$ defined between the first and second arms and dimensioned to correspond to a predetermined width $W_2$ dimension of defined between the fitting member and the fitting body when the fitting member is coupled to the fitting body, such that when the fitting member is properly coupled to the fitting body, $W_1$ is at least substantially equal to $W_2$, and the gauge portion fits over the fitting member connected to the second fitting member;
placing the gauge portion over the fitting member connected to the fitting body; and
verifying that the fitting member is properly connected to the fitting body when the gauge portion of the verification tool fits over the fitting member connected to the fitting body.

\* \* \* \* \*